INVENTOR
Norman L. Carr

United States Patent Office 3,654,131
Patented Apr. 4, 1972

3,654,131
MAINTAINING A GASEOUS PHASE IN A HYDRO-
CARBON HYDROGENATION SYSTEM
Norman L. Carr, Pittsburgh, Pa., assignor to Gulf Research & Development Company, Pittsburgh, Pa.
Filed Dec. 15, 1969, Ser. No. 885,066
Int. Cl. C07c 5/10; C10g 23/00
U.S. Cl. 208—57
16 Claims

ABSTRACT OF THE DISCLOSURE

A petrochemical plant is disclosed comprising reactor means including a catalyst capable of inducing a catalytic exothermic reaction therein, means for controlling the inlet and outlet temperatures of said reactor means, means for supplying reactants including a normally liquid reactant to said reactor means, and the basis for the control means for maintaining the temperature of said reactants above the dew point thereof in every part of said reactor means.

Also disclosed is a method for operating a petrochemical plant having a plurality of catalytic reactors, said method comprising the steps of supplying a gaseous and liquid reactant stream to one of said reactors in heat exchange relation to an effluent stream of another of said reactors, supplying a liquid and gaseous feed stream of said other reactor in heat exchange relation with the effluent stream of said one reactor, supplying said effluent stream of said other reactor to a third reactor, completing the reaction in said one reactor, terminating the reaction in said other reactor, and permitting the unused reactants from said other reactor to complete the reaction in said additional reactor.

My present invention relates to means and methods for controlling reactivity in petrochemical processes and more particularly to a determination of the level of reactivity by closely controlling the reactor conditions above dew point of the reactor fluid(s).

During the course of this description, my invention will be elaborated upon in connection with a particular petrochemical process involving the hydrogenation of benzene to cyclohexane of very high purity, i.e. about 99.95 percent pure. The benzene impurity is about 50 p.p.m. or less and the $C_6$ paraffins, less than about .1000 p.p.m. It will be understood, however, as the description proceeds that the principles of my invention can be adapted with facility to related and other petrochemical or chemical processes.

In previous and known processes for producing cyclohexanes extreme purity has been an aim which has been sought after for many years with varying degrees of unsuccess. Purity requirements must of necessity be built into the basic petrochemical process, owing to the difficulties of after-purification. Two common impurities in the cyclohexane process are, of course, benzene and n-hexane. The former impurity obviously represents incomplete reaction, while the latter product stems from a side reaction which is caused primarily by the lack of proper reactivity control. I have discovered that the development of proper means and methods for controlling petrochemical processes can essentially eliminate these impurities except for trace amounts.

The extreme difficulty inherent in after purification is apparent from the closeness of the boiling points of the cyclohexane product and the benzene and n-hexane impurities. This condition renders the application of economic separation techniques virtually impossible.

In previous cyclohexane processes, the development of localized "hot spots" in the reactor or reactors has long been a problem. Solution of the problem has been thwarted owing to the extreme reactivity of the reactants and a lack of causal knowledge. Previous control schemes have been inadequate to prevent the formation of "hot spots" by properly controlling conditions affecting the reactants not only in the feed streams, but throughout the reactor system. There has likewise been no adequate program for the early detection of "hot spots," when encountered, and for the immediate imposition of proper corrective actions. I have developed suitable methods and means for carefully monitoring and controlling the various reactant streams to the one or more reactors in order to minimize or prevent altogether those conditions which lead to the formation of localized hot spots. If such hot spots are accidentally encountered, however, my control scheme affords early detection followed by immediate corrective action.

In cyclohexane production, as in many other petrochemical processes, an intended reactivity rate is effected and hopefully maintained through the use of a suitable catalyst. Because of the expense of catalyst entailed in the reaction, it is highly beneficial to prolong the useful life of the catalyst to the greatest possible extent. In known processes, catalyst requirements have been critical within each of the reactors and is useful life has been unnecessarily foreshortened. It is also important to prevent catalyst damage, requiring replacement and resulting in costly non-productive plant shut-down periods. These situations complicate reactor design and lower productivity of the operation. I have developed an arrangement for eliminating catalyst criticality in some of the reactors, for prolonging catalyst life, and for compensating decline in catalyst activity. This endows the affected reactor or reactors with added capacity while producing a product of highest purity. I have discovered several factors resulting in catalyst deactivation and have developed methods and means for preventing catalyst deactivation. For example, although the catalyst is subjected to elevated temperatures in its preparation, I have found that operation of the cyclohexane process at certain temperatures considerably below these preparation temperatures will result in rapid catalyst deactivation. Under conditions of temperatures above about 550° F. in a hydrogen-containing atmosphere, and for periods of the order of a few hours, irreversible catalyst deactivation can occur. This occurs in the absence of hydrocarbons ($C_6$) and at low or normal operating pressures. It appears that high-temperature catalyst deactivation will occur whenever local temperatures exceed the process maximum, or 550° F. It also appears that the extent of deactivation is of the order of reducing the activity by one-half. By controlling these and other operating characteristics in accordance with my invention, I have produced a controlled process which can operate for a much longer period of time.

I have also found that elimination of certain impurities in the feed streams, for example sulfur compounds in the make-up hydrogen and the benzene feed, and the maintenance of adequate hydrogen partial pressures also contribute to retention of a high level of catalyst activity. The operation must be further controlled to avoid physical disintegration or catalyst fracturing resulting from temperature runaways, such as the aforementioned hot spots, and high pressure drops across the catalyst bed or beds. Avoiding operations which result in coking within and around the catalyst particles also minimizes physical damage to the catalyst.

In the past, side reactions of the cyclohexane operation have contributed $C_6$ paraffins, namely n-hexane. These side reactions, which involve hydrogenolysis of cyclohexane, have been difficult to suppress without an adequate control scheme. Where a number of reactors are operated in tandem, side reaction impurities have been highest in the output of the first reactor while unreacted benzene impurity has been more pronounced from the output of the last reactor. I have found for example that a 12° F. increase in outlet temperature of the first reactor increases the amount of trace paraffins by about 1.8 fold.

Up to now, I have stressed the need to minimize cyclohexane impurities, to prevent catalyst deactivation, and to prevent (a) "hot spots," (b) reactor temperature runaway conditions, and (c) pressure drop buildup across the reactors. Two important reactor design and control criteria must be followed to achieve specification cyclohexane purity. Temperatures must be kept below 550° F., at all times to prevent deactivation. Dew point conditions (encountering liquid phase in the reactor fluid) must be avoided to prevent reactor "hot spots." The proper proportion of and dynamic control of the fluid flow rates must be maintained both for control (operation) and for prevention of reactor temperature runaway and pressure drop buildup.

In accomplishing the aforementioned desirable results, I have discovered that liquid phase conditions occurring anywhere in the cyclohexane reactor section and particularly in the inlet streams to the one or more reactors must be avoided at all times. If liquid phase (mixtures of benzene and cyclohexane) conditions develop at or within the reactor entry, this liquid wets the catalyst pellets. This "wetting" action stops the normally fast catalytic reaction between vaporous benzene and hydrogen within the catalyst. This permits a flowing slug of benzene-rich fluid to pass unreacted into the hotter section of the bed. On reaching the normal hot region in the bed, this benzene-rich liquid reacts locally to cause higher than normal heat release. The reason the liquid is benzene-rich is that in the liquid phase the reaction rate of benzene is relatively very low. Upon vaporization at higher temperatures, the rate becomes extremely rapid. Once the hot spot was generated, it continues to grow, as the result of both hydrogenation and hydrogenolysis reactions. If liquid phase conditions are encountered even for a very brief interval reactor runaway temperatures will probably develop. For even localized occurrences of liquid phase conditions, both benzene and cyclohexane feeds should be terminated at all of the reactors. This must be done immediately to avoid any possibility of a runaway temperature condition.

To avoid even localized liquid phase conditions is to maintain the reactor fluids above their dew points throughout the entire system. This is accomplished by maintaining all reactor inlet temperatures above the anticipated dew point; maintaining a predetermined recycle gas flow throughout the operation; avoiding excessive cyclohexane recycle flows; maintaining a predetermined recycle gas composition, for example around 65% hydrogen and 25% methane; and avoiding comparatively large changes in feed, loading or other dynamic excursions.

An important aspect of my invention is the discovery of the necessity for maintaining vapor phase conditions throughout the reactors during the course of the operation, in order to avoid dew points and two-phase operation. If the operation is controlled as outlined in accordance with my invention, maintenance of uniform, vapor phase conditions is assured. I have demonstrated the seriousness of the consequences of excursions below the dew points of the reactants, although the cause of hot spot problems has not been understood or even defined in the past.

As noted previously, for an efficient operation and maximum productivity, it is desirable to eliminate or at least to mitigate the criticality of catalyst activity-loading relationship. This critical relationship has been essentially eliminated in accordance with my invention, in a multiple reactor system by a benzene by-pass around a second reactor to a third reactor. As a result the reaction system is endowed with added capacity while producing a product of higher purity. For maximum capacity a separate feed to the last reactor of a multiple reactor series is desirable, depending upon the activity of the contained catalyst. The by-pass line also adds flexibility to the process, as the by-passing can be altered as the activity of the catalyst changes.

In point of fact, active catalyst can be dumped, screened and reused with no discernible activity loss. My invention provides conditions under which this can be readily accomplished.

In carrying out my invention the necessity of using proper and conventional instrumentation and process monitoring will be evident as this description proceeds. For example, reactor temperature information and display are important, as well as the several flow rates involved into each reactor. Monitoring of the operation in this manner can be afforded by conventionally located instrumentation to supply the information required for the carrying out of my novel process. For example the use of a conventional hydrogen analyzer in connection with the recycle gas line is desirable for my novel control method and means.

To prevent the introduction of slugs of feed liquid into the reactor system, it is essential to maintain the temperature of the input fluid streams in the cyclohexane process above the dew point temperature, in the illustrated case about 290° F., to eliminate the potentiality of liquid phase formation. On the other hand, I have found that excessive deactivation of the catalyst occurs if the temperature of the reaction is permitted to rise appreciably above 550° F.

The operation can proceed satisfactorily at reactor outlet temperatures in excess of about 500° F. but close attention must be given to the operation. Whenever it is anticipated that a high temperature, i.e., about 550° F. or above will be experienced, then the benzene and cyclohexane feeds to the reactor or reactors should be terminated. Liquid feed also should be terminated in the event of low gas flow. The benzene "cut out" desirably is operated automatically by suitable limit switches, sensing circuitry, and the like whenever the outlet temperature approaches 550° F. or the gas flow is below a pre-set level. Benzene feed should also be terminated in the event of termination of make-up hydrogen flow for periods longer than about 5 minutes. Temporary loss of hydrogen can be usually tolerated for shorter intervals assuming there is adequate recycle hydrogen with a purity above about 50 mol percent. If the recycle gas content falls below about 50% hydrogen, then benzene feed should be terminated immediately upon loss of make-up hydrogen flow.

When starting up the operation, the rate at which benzene is introduced to the reactor system should be very carefully regulated. This applies to all other situations where benzene flow rate regulation is required. Sudden step increases in benzene flow must be avoided to prevent the introduction of liquid benzene to the catalyst bed and temperature runaways or hot spots. I have found that benzene flow can be increased in safe increments of up to about 10% of the designed flow rate. After each incremental increase in flow rate the benzene feed should be maintained constant until the process exhibits steady state conditions before making an additional benzene rate increase.

Reactor pressure drop indications should be available on a continuous basis across each reactor in the reactor system. If an excessive pressure drop occurs suddenly across any reactor, this is justification for terminating flows of both the benzene feed and the recycle cyclohexane. In general, sudden purposeful changes in a number of process variables should be avoided, for example, reactor temperatures, benzene flows to the reactors, recycle gas flow, make-up hydrogen flow, system pressures, and recycle cyclohexane flow. All process conditions of flow and temperature must be met, before benzene feed is introduced.

The primary problem confronted by the operation is that of maintaining the several reactor fluids entirely in the vapor phase, i.e., above their dew points. In this connection, it should be noted that recycle cyclohexane must be combined with the recycle hydrogen such that the cyclohexane remains above its dew point when admixed with the recycle hydrogen. Under normal conditions of recycle flow and composition, the inlet temperature to the first reactor system desirably is 50–60° F. above the dew point for the several reactants. However, owing to the inadvertent inclusion of massive quantities of cyclohexane in the recycle fluid, the dew point of the reactants fed to the first reactor can be raised to about 295° F. Accordingly, adequate preheating of the reactants is necessary to avoid dew point temperatures.

A minimum reactor inlet temperature, then, is essential to avid two phase conditions anywhere within the reactor section and attendant temperature excursions. These excursions can cause coking, high pressure drops across the reactors, localized hot spots, and catalyst destruction. Moreover, a localized hot spot can engulf the entire reactor system within seconds. On the other hand, a maximum operating temperature is imposed by the necessity of avoiding irreversible catalyst deactivation. My invention in particular contemplates a control scheme and operating procedure for accomplishing these desirable results.

Accordingly I provide a petrochemical plant comprising reactor means including a catalyst capable of inducing a catalytic exothermic reaction therein, means for controlling the inlet and outlet temperatures of said reactor means, means for supplying reactants including a normally liquid reactant to said reactor means, and control means for maintaining the temperature of said reactants above the dew point thereof in every part of said reactor means.

I also desirably provide a similar petrochemical process wherein additional means are provided for limiting the maximum temperatures of said reactants at any point within said reactor means to a temperature below a predetermined deactivation temperature of said catalyst.

I also desirably provide a similar petrochemical process wherein said reactor means include a number of reactors and said control means include regenerative heat exchange means for heating and vaporizing a liquid feed stream for one of said reactors by heat exchange with an effluent stream of another of said reactors.

I also desirably provide a similar petrochemical process wherein said liquid feed stream includes a reactant liquid and a diluent liquid, and means are provided for varying the flow rate of each of said liquids relative to the other to control the temptrature of said admixed feed stream and said reactor effluent stream after passing through said quench means and to control the reactivity thereof in said one reactor.

I also desirably provide a similar petrochemical process wherein said temperature control means in addition include means for conveying an additional stream of said reactants to said other reactor and to an additional reactor in tandem, and additional heat exchange means are coupled to said additional stream and to an effluent of said one reactor wherein the maximum temperature of said other reactor is limited by a valved by-passing conduit from said additional heat exchange means directly to said additional reactor.

The process of the invention is made more versatile and productive by feeding benzene also to the final reactor. This can be done as long as the process constraints are not violated.

During the foregoing discussion, various objects, features and advantages of the invention have been set forth. These and other objects, features and advantages of the invention together with structural details thereof will be elaborated upon during the forthcoming description of certain presently preferred embodiments of the invention and presently preferred methods of practicing the same.

In the accompanying drawings I have shown certain presently preferred embodiments of the invention and have illustrated certain presently preferred methods of practicing the same, wherein.

Figure 1:
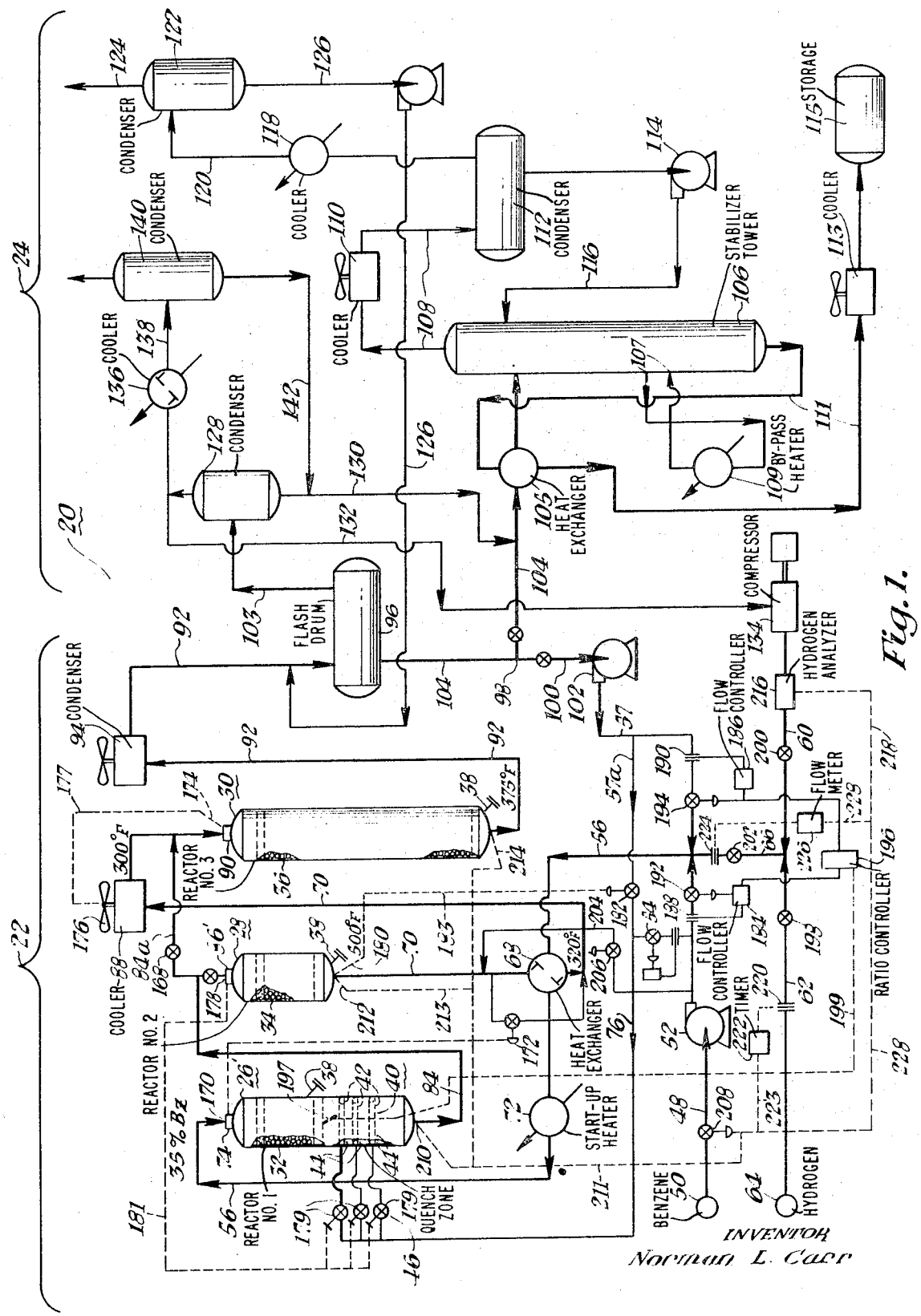
FIG. 1 is a block flow diagram of one form of petrochemical process arranged in accordance with my invention for the production of cyclohexane of high purity.

In known cyclohexane processes, a multiple reactor system has been employed in which the reactors are essentially identical to one another. The operating conditions in each of the reactors are maintained as nearly the same as feasible. For example, the operating temperature range and benzene and hydrogen feed rates are similar in each reactor, and the recycle cyclohexane is evenly divided among the several reactors. The basic approach to operating this prior arrangement is the completion of the benzene conversion within each reactor. As demonstrated herein, this type of prior reactor system provides an inadequate dew point control such that catastrophic temperature excursions can occur.

My novel process differs from the aforedescribed operation, although a multiple reactor system can be employed. In such case the size distributions of the reactors utilized in my process are differentiated for the reasons detailed below and discussed generally heretofore. My new design gives potentially higher-purity product and better control above dew point. Benzene content can be pushed lower, and the $C_6$ impurity decreased because of low space time at temperatures above about 460° F. I also employ a different approach to reactor operation in which heat and material balance are inter-related and coupled for an enhanced control capability. Further, the extent of conversion in each reactor differs not only from previous systems but differs also from reactor to reactor in my novel system. In our advantageous three-reactor system the middle reactor is the smallest to provide the advantage of high purity (lower impurity n—$C_6$) while also minimizing the amount of benzene in the cyclohexane product.

This novel system is necessary owing to the exothermic nature of the reaction, in this example, the hydrogenation of benzene to produce cyclohexane. It is, therefore, necessary to maintain a very close control over operating temperatures at the inlets and outlets of each reactor and also to maintain particular temperature profiles through the catalyst beds of the reactors by an interdependent control of both heat and material balances. An important factor in maintaining such controls is the avoidance of any dew point temperature to obviate any potential existence of a localized two-phase condition anywhere within the reactor system. Even momentary existence of dew point conditons can introduce slugs of liquid reactants into the catalyst bed which then vaporize to produce an overly concentrated area of reactants in a subsequent, higher temperature area of the catalyst bed. These areas produce localized hot spots and potential temperature runaways of catastrophic proportions. In point of fact, relatively slight changes in temperature and comparatively small composition changes could result in reactor damage, catalyst fracturing and explosion.

Control of temperature is also essential to minimize benzene side reactions, the most significant product of which is n-hexane. When properly controlled, in accord with my invention, the process yields only trace amounts in the order of 300 p.p.m. This side reaction increases exponentially with increases in temperature at the rate of about 1.65 fold for each 10° F. increase in temperature. The major feature of the disclosed single phase operation is a restricted operating temperature span resulting from relatively high dew point temperatures on the one hand and relatively low catalyst deactivation and side reaction temperatures on the other. In consequence, at least a portion of the reactor section must be operated within a few degrees (about 10–20° F.) of the dew point temperature. One arrangement for minimizing operating temperatures is to dilute the benzene feed with cyclohexane to act as a heat sink; otherwise temperature rises of about 1000° F. would be encountered. The amount of side reactions becomes significant at temperatures substantially above 480° F. Accordingly, in most cases, it is desirable to limit the inlet temperatures of the several reactors to points above about 290° F. to preclude the existence of two phase systems in these areas. The maximum or outlet temperature of each reactor must be below 550° F. at which point the catalyst irreversibly deactivates and desirably below 480° F. to reduce side reactions to a tolerable minimum.

If the dew point is reached anywhere within the reactor system, the operation can deteriorate within minutes. Reactor disturbances can move through the system within a matter of seconds. If the dew point condition occurs within the system, it is necessary to cut-off the reactant feed streams. In some cases, the reactant flows simply can be reduced, or alternatively, heat can be added to the system through the feed stream pre-heaters.

In general, the control scheme is complicated by the fact that the occurrence of dew point temperatures in the reactor section engenders a two phase system causing a temperature runaway and related, often catastrophic events. The operation is further complicated by the enforced operation of the reactor system within a very few degrees of the dew point, for the reasons mentioned above. The process is a dynamic system, with the result that dew point temperatures change rather drastically with changing reactor conditions. It is difficult, if not impossible, without computer technology, to compute the dew point of a particular reactor or reactor area from considerations of outlet and inlet temperatures, pressure variations, concentration of reactants, ratio of feed to diluent or recycle cyclohexane, liquid/gas ratios, etc. Accordingly, I utilize a dew point computer, i.e. a special purpose computer, to monitor dew point conditions on a continuous basis in conjunction with automatic devices for modifying or terminating the benzene feed, if it is desired to control the reaction solely by a comparison of calculated dew point data with observed temperatures, such as reactor inlet and outlet temperatures. In many places within the reactor system, the reaction must proceed within a very few degrees of the dew point. Operating personnel are not able to determine (without the use of a computer) the specific area in the reactor system in which the dew point is being approached too closely. A computerized system for this purpose is set forth below with adaptive modifications for alternative incorporation into the control scheme of my novel system.

Referring now more particularly to FIG. 1 of the drawings, the principles of my invention are illustrated in connection with an exemplary cyclohexane plant 20. The plant 20 includes a reactor section 22 and a stabilizer section 24. Comprising the reactor section 22 are a number of individually sized reactors 26, 28 and 30, each of which contains a catalyst bed 32, 34 or 36. In the illustrated arrangement the catalyst beds are unequal in size, for example in the ratio of about 6:3:10 respectively. The catalyst in this case is a nickel-on-kieselguhr of known composition and furnished in a form of small pellets. The catalyst can be loaded from the tops of the respective vessels 26–30 and dumped through catalyst drop out 38 of each reactor vessel adjacent the lower extremity of its catalyst bed.

In this arrangement, the initial reactor vessel 26 is elongated to a greater extent than its included catalyst bed 32 would otherwise dictate in order to include a quench section 40. The quench section 40 can include a plurality of ring headers 42, with three such headers being employed in this example although a different number can be utilized. Each of the ring headers 42 includes a number of spray nozzles denoted generally at 44. A valved and branched conduit system 46 variably supplies the quench headers 42, as dictated by operating conditions of the plant 20, in the manner described below.

Figure 8:
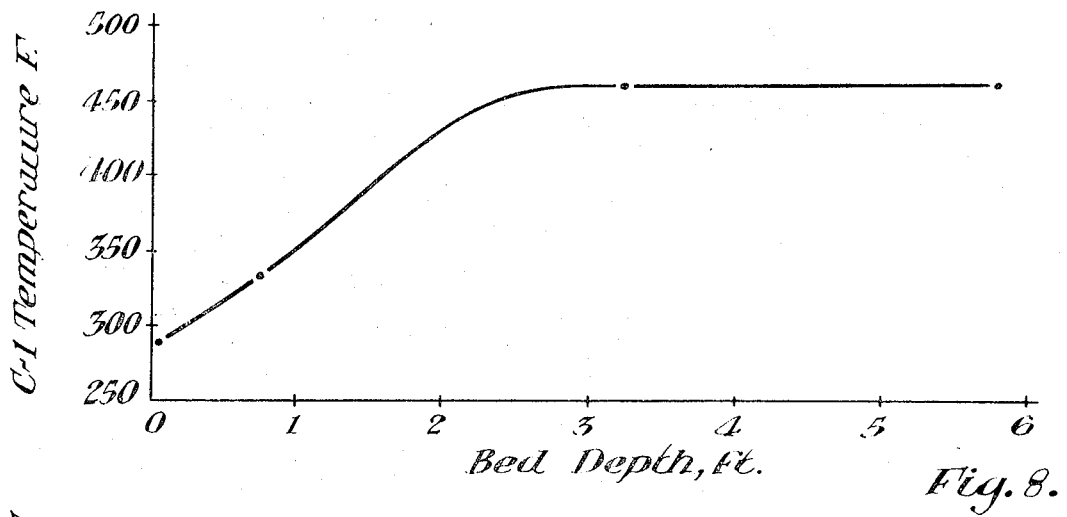
FIGS. 8–10 are graphical representations of reactor temperature profiles based on distance of catalyst beds in a multiple reactor system.

Fresh benzene is charged through feed conduit 48 and pump 52 from tankage or other suitable source of benzene denoted generally at 50. Suitable valving 54 and 192 can proportion the pump output such that in the illustrated cyclohexane plant, about ⅓ of the benzene feed is diverted through conduit 56. That portion of the feed benzene in conduit 56 is mixed with recycle cyclohexane and recycle gas streams (conduits 57, 60 respectively) the latter of which has been admixed previously with a make-up hydrogen stream (conduit 62) from a suitable source of fresh hydrogen denoted diagrammatically at 64. The combined recycle gas and make-up hydrogen stream is added to the benzene feed portion in conduit 56 and then heated to reaction temperature (about 290° F., FIGS. 2 and 8) in regenerative heat exchanger 68 by heat exchange with the hot effluent (conduit 70) from the second reactor 28. The heated feed stream then passes through stream start up heater 72, which is used only during the initial phase of the start up procedure, and is discharged into the first reactor 26 through its inlet port 74.

Within the first reactor 26 essentially all of the benzene is catalytically hydrogenated to cyclohexane in a highly exothermic reaction. The hot vapors flowing from the bottom of the catalyst bed 32 are quenched to about 300° F. in the lower or quench portion 40 of the first reactor vessel. As evident from FIG. 8 the temperature of the reaction products entering the quench area 40 is in the neighborhood of 465° F.

The liquid quench material comprising cold fresh feed for the second reactor 28 supplied from feed pump 52 through conduit 76 and the aforementioned branched conduit 57 to which recycle cyclohexane has been added through conduit portion 57a. The quench system 42–46 is arranged to quench the effluent vapor from the first reactor bed 42 to about 300° F. The spray nozzles 44 are arranged as discussed previously to ensure complete vaporization of the quench liquid flowing therethrough.

Figure 3:
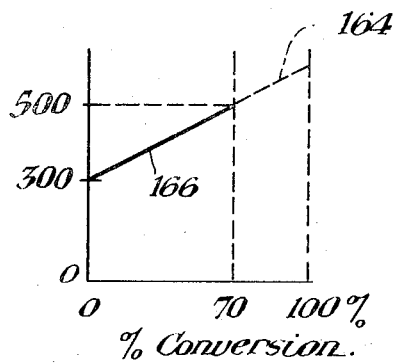
FIG. 3 is a graph showing variations in temperature within another of the reactors.
Figure 9:
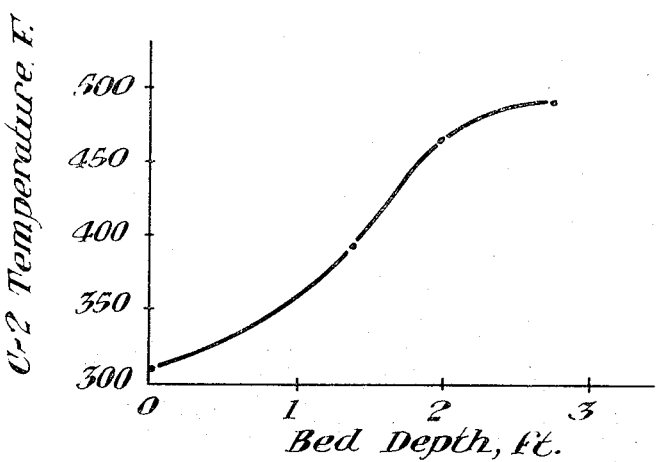
Figure 10:
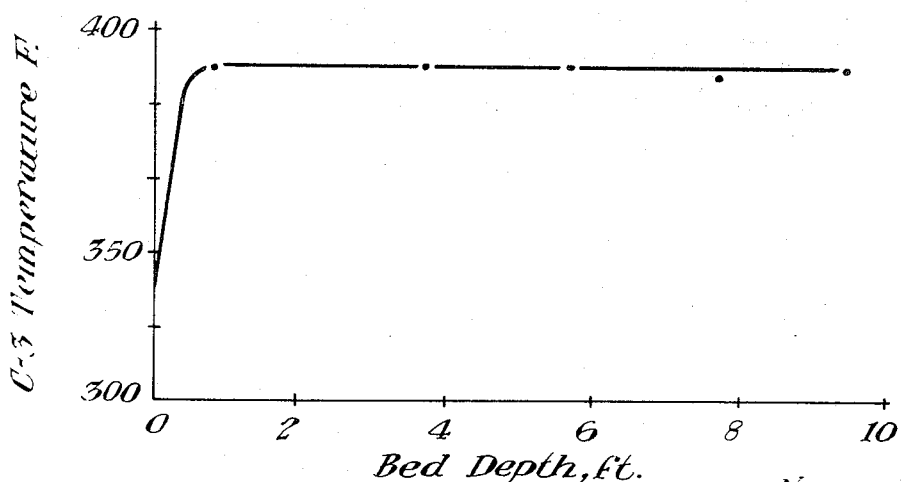

The effluent vapors flowing through first reactor outlet conduit 84 now consists of the vaporized, added benzene feed (about ⅔ of the total benzene feed), liquid recycle cyclohexane added as part of the quench liquid (conduits 57a, 76), cyclohexane product of the first reactor 26, an unused portion of the hydrogen supplied to the first reactor portion 26 (about ⅔ of the total hydrogen feed including recycle and make-up hydrogen), and gaseous recycle cyclohexane. The feed stream thus constituted is added through conduit 84 to inlet port 86 of the second reactor 28 at a temperature of 300° F. (FIGS. 3 and 9). The second reactor employs a corresponding smaller catalyst bed 34 as the reaction therein is terminated prior to complete hydrogenation of the benzene. Within the reactor 28, then, about 70% of the benzene feed is converted to cyclohexane and the hot effluent vapors are discharged from the second reactor 28 at a temperature of about 500° F. to the regenerative heat exchanger 68 described previously. From the heat exchanger 68 the partially cooled product and feed vapors from the second reactor 28 continue along conduit 70 to an air cooled intermediate cooler 88 where the feed stream for the third reactor 30 is closed to about 300° F. (FIGS. 4 and 10) before entering inlet port 90 of the third reactor. In the reactor 30 all of the remaining benzene is converted to cyclohexane of high purity in the considerably longer catalyst bed 36. The hot effluent vapors exit from the catalyst bed 36 at a temperature of about 380° F. and are conveyed through conduit 92 to condenser 94 where they are cooled to about 120° F. or less and then discharged into a high pressure flash drum 96.

By thus controlling the heat and material balances of the first reactors 26 and 28, the composition of the feed stream fed to the third reactor 30 will vary very little. That is to say the occurrence of dynamic problems in the first or second reactor will be noticeable in the succeeding reactor or reactors. Thus, if the dynamic conditions of the first and second reactors are thoroughly controlled as outlined above, control of the third reactor 30 is relatively easy. In this connection it is necessary only to provide means for adjusting the temperature of the feed stream to the third reactor 30 owing to the potentiality of the variable by-pass around the regenerative heat exchanger 68.

Within the flash drum 96 the uncondensed gases are separated and exit from the drum by conduit 103 and compressed and recycled to the first and second reactors 26, 28 as described below. The liquified cyclohexane is conveyed through conduit 104 to the stabilizer section 24 of the cyclohexane plant 20. A portion of the cyclohexane liquid is recycled through conduit 100, pump 102 and the aforementioned branched conduit section 57, 57a to the first and second reactors, respectively, as described above.

The product cyclohexane liquid in conduit 104 and the gases unavoidably dissolved therein are pressurized from the high pressure flash drum 96 into regenerative heat exchanger 105 described below and thence into stabilizer tower 106. The tower 106 is designed in a conventional manner to separate the light components or dissolved gases from the cyclohexane product which exit from the tower 106 through conduit 108. To prevent unnecessary loss of cyclohexane the vent gas from the stabilizer tower 106 is cooled to about 45° F. in cooler 110 before entering condenser 112. Any cyclohexane condensate is returned to the tower 106 through pump 114 and conduit 116. The effluent gases from the condenser 112 are further cooled in cooler 118 and supplied through conduit 120 to a second condenser 122, the effluent gas of which is vented at 124. The condensate from the second condenser 122 is pumped through conduit 126 to the inlet of the flash drum 96 for further separation.

The cyclohexane liquid within the stabilizer tower 106 can be tapped at 107 for additional heating, as required, through bypass steam heater 109. The product cyclohexane is drawn off the bottom of the tower 106 through conduit 111 which passes through the aforementioned heat exchanger 105 to heat regeneratively the incoming cyclohexane stream in conduit 104 for the tower 106. From the heat exchanger 105, the product cyclohexane is conducted to cooler 113 and thence to tankage 115 or other suitable storage.

The uncondensed gases from the flash drum 96 including mainly cyclohexane vapor and unused hydrogen are supplied through conduit 103 to condenser 128. The condensed portion of the cyclohexane vapor is forwarded to the stabilizer plant section 24 through bottom conduit 130. A major proportion of the gaseous effluent of the condenser 128 is supplied through conduit 132 and compressor unit 134 to the recycle and make-up system 60–66 and thence to the first reactor feed stream through conduit 56. The unneeded portion of the effluent gases from condenser 128 are cooled in cooler 136 and supplied through conduit 138 to a second condenser 140. Substantially all of the contained cyclohexane is condensed in the condenser 140 and supplied from the bottom conduit 142 to the stabilizer section 24 through conduits 104, 130.

Figure 5:
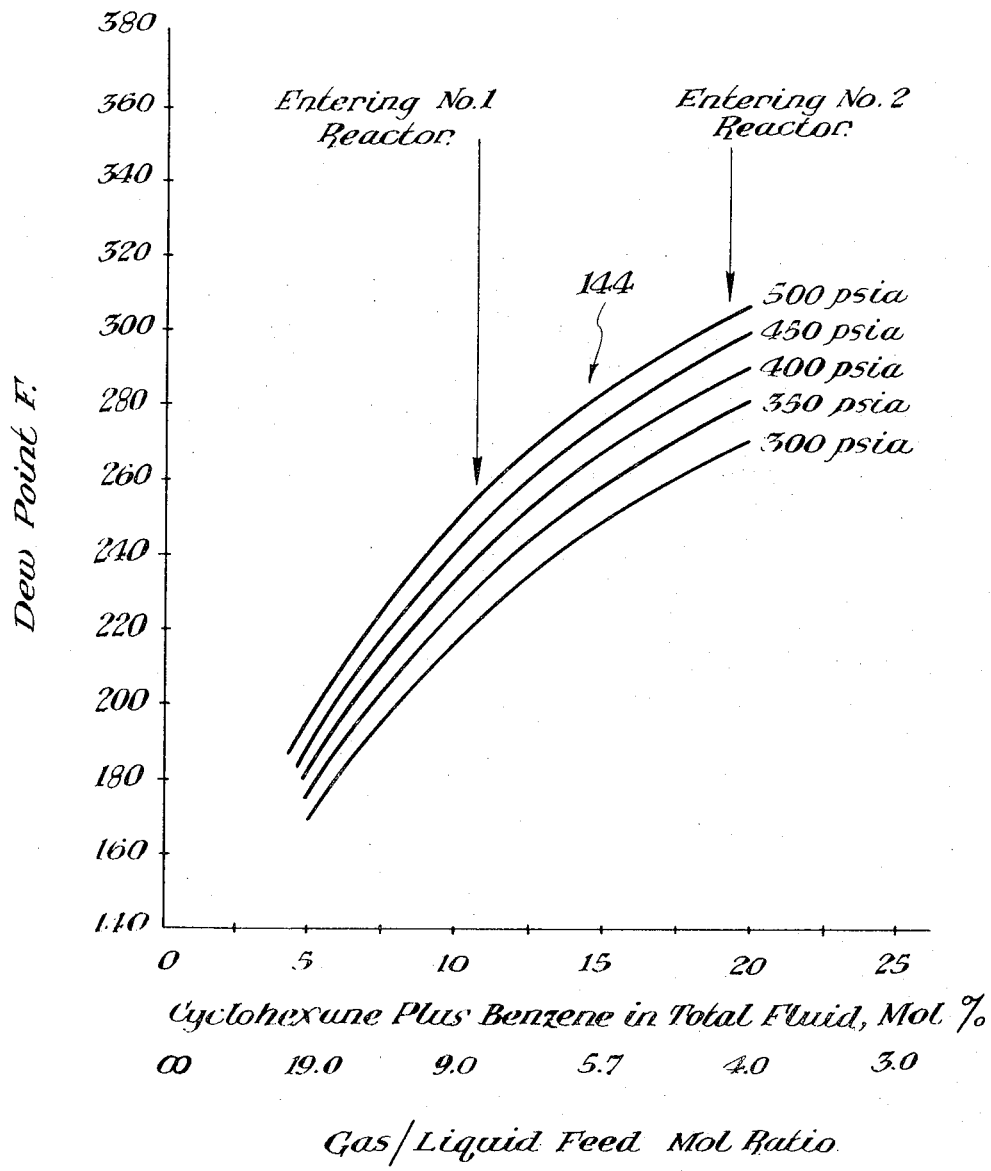
FIG. 5 is a graphical representation of a variation in the dew point temperatures in the reactor system as influenced by changes in system pressure, based on changing total amounts of cyclohexane and benzene in the total fluid, and upon changing gas/liquid feel mol-ratio.

The wide variation in dew points and the difficulty of ascertaining a specific dew point at a particular location within the reactor section 22 is evident from FIG. 5. Dew point curves 144 denote the increase in dew point temperatures with increasing pressure as would be expected. Also shown is a non-linear increase in dew point temperatures with percentage of cyclohexane and benzene in the total fluid feed. At the same time dew point temperatures decrease non-linearly and inversely with increasing gas/liquid mol ratios of the several feed streams to the reactor. As evident from the foregoing, both the mol percentage of the cyclohexane and benzene in the total fluid content in the reactors varies from reactor to reactor, which is also the case in the total gas/liquid ratio. The operating pressures of one or more of the reactors may be different as indicated below.

Previously the necessity of avoiding dew point temperatures within the reactor system has been unknown. Likewise the particular means and method for controlling the various material balances, material flows, and reactor temperatures to avoid dew point temperatures has been unknown.

Figure 6:
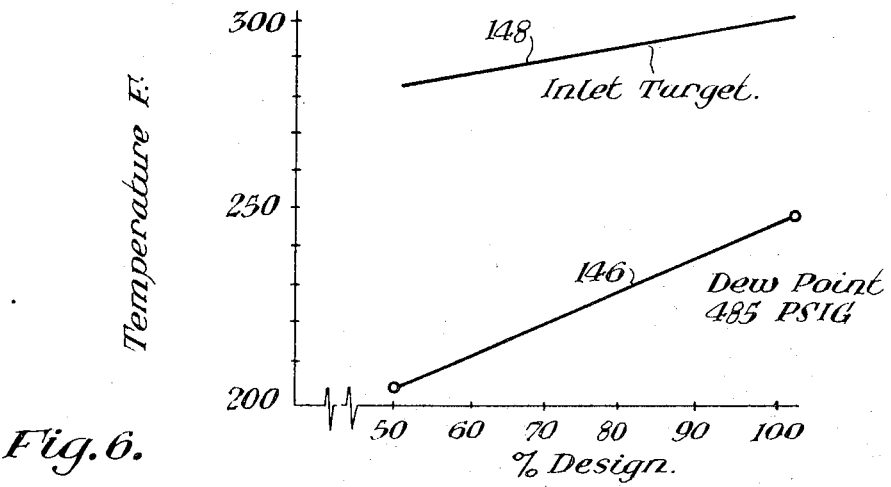
FIGS. 6 and 7 are graphical representations showing the relationship between reactor inlet temperatures and dew point temperatures as a function of percentage of design feed rate, in a multiple reactor system.
Figure 7:
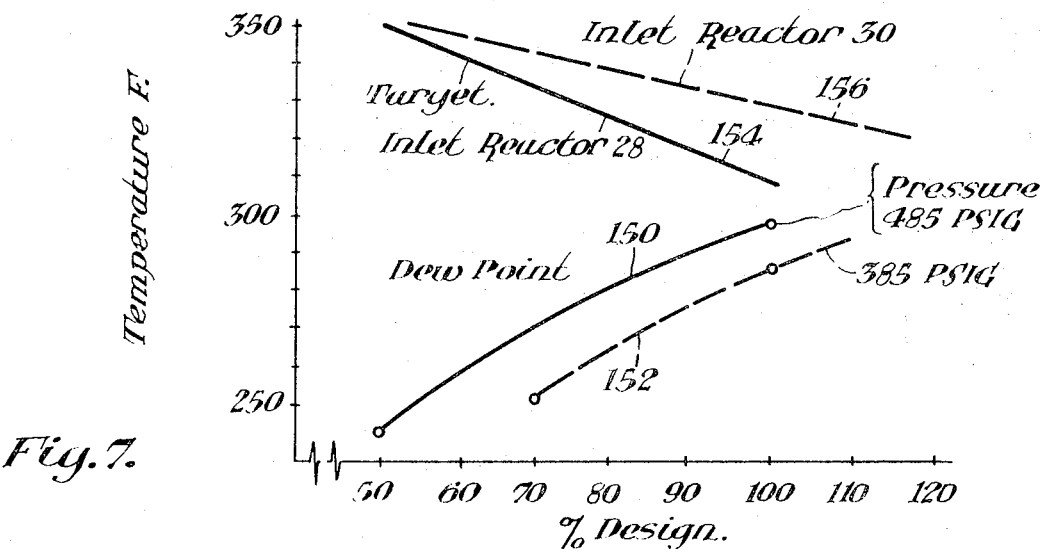

In FIGS. 6 and 7 the effect of varying feed rates from 50% capacity to a given design capacity for the illustrated cyclohexane plant is illustrated. Curve 146 of FIG. 6 represents the variation in dew point at operating pressure as the reactants are varied from 50% to full design capacity in the first reactor 26. The variation in dew point is linear as the reactants are varied not only as to quantity but also in proportion to one another. The permissible variation in temperature of the entering reactants is limited but in the same general direction as the dew point progression. In general the inlet temperature must be maintained sufficiently above the dew point to prevent the occurrence of dew point conditions at any location within the catalyst bed 32 of the first reactor 26 and also to prevent unduly high temperatures which would irreversibly deactivate the catalyst.

A different situation attains in the second and third reactors 28, 30 as evident from FIG. 7. Thus, as these reactors are varied from 50% to full capacity their dew points follow curves 150, 152 respectively. However, their inlet temperatures (curves 154, 156 respectively) must be progressively reduced to avoid overheating of the catalyst. From curves 150, 154 relating to the second reactor 28 it will be seen that dew point considerations become highly critical, as the inlet temperature (curve 154) is only a few degrees above the corresponding dew point temperature (curve 150) at full capacity. The curves 150, 154 cannot intersect as the corresponding feed conditions would then produce hot spots, temperature run-aways and attendant destruction of the catalyst or of the reactor itself. On the other hand the temperature curve 154 cannot be higher as the resulting reaction temperature would then be uniformly and sufficiently high to commence the irreversible deactivation of the catalyst. The situation in the third reactor 30 is similar but less critical as evident from curves 152, 156.

If the reaction is to be terminated prior to completion a shorter catalyst bed must be utilized in the second reactor. As noted previously the reactions in the first and third reactors are controlled so that the maximum bed temperatures along the length of the bed stays well below about 480° F., as evident from FIGS. 8 and 9. This further reduces the potential significance of benzene side reaction and decreases the percentage impurity of the cyclohexane product.

Figure 11:
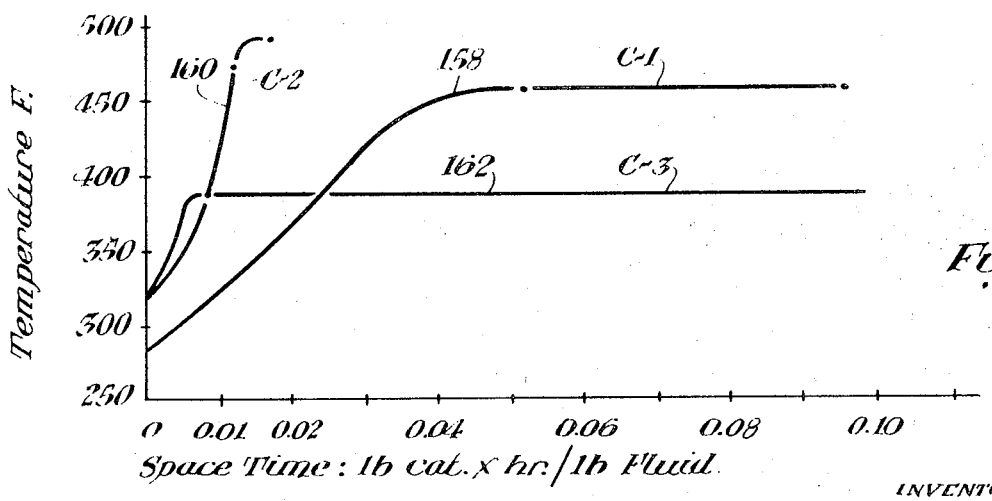
FIG. 11 is a graphical representation of space time temperature relationships in a multiple reactor system.

FIG. 11 further illustrates the reactivity rates of the several reactors as evident from the temperature versus space-time curves 158, 160, 162 for the reactors 26–30 respectively. From the groups 158–162 it will be apparent that the reactions in the first and third vessels can be driven to completion at temperatures above the respective dew points but below the temperature at which the catalyst begins to deteriorate. On the other hand as evident from the curves 160 the temperature of the second reactor 28 rises rapidly and is held below about 520° F. through benzene rate control and a short reaction time. In this example, essentially all the benzene fed to the second reactor was converted.

Figure 2:
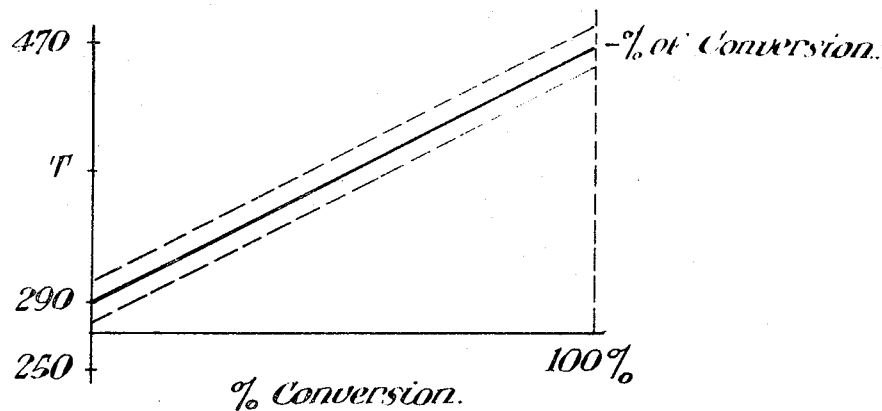
FIG. 2 is a graph showing temperature conditions in one reactor of the reactor system utilized in the FIG. 1 arrangement.
Figure 4:
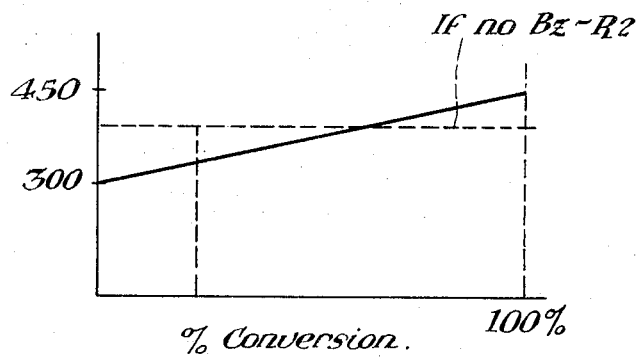
FIG. 4 is a graph showing temperature variations in a third reactor of the reactor system.

FIGS. 2, 3, and 4 are of interest in this connection in that they show respectively the variation in temperature with percentage of total conversion of the benzene feed. FIG. 3 in particular demonstrates the desirability of terminating the reaction in the second reactor 28 in advance of complete conversion of the benzene. Thus, if the reaction in reactor 28 were permitted to go to completion, the broken line portion 164 of curve 166 indicates that the reactor temperature would be considerably in excess of 500° F. or at a level sufficient to permanently deactivate the catalyst. As noted previously subjecting the catalyst to temperatures in the neighborhood of 550° F. for several hours is sufficient to irreversibly deactivate the catalyst by a factor of one-half its original activity. Of course, the reaction in the second reactor could go to completion if the final temperature were below 500° F. at complete conversion.

In the event of occurrence of dew point conditions in any of the three reactors the feed streams thereto can be eliminated by closing valves 54 and 192 as required or by shutting down the plant entirely with closure of benzene feed valve 208, as described below. However, because the operating characteristics are more critical in the second reactor 28, I contemplate by-passing a portion of the second reactor feed stream (conduit 84) through by-pass 84a (FIG. 1). This is made possible by the larger catalytic bed 36 which is capable of a certain amount of overloading as evident from curves 152, 156 of FIG. 7. The purity of the cyclohexane product is not substantially impaired, and, of course, the purity tolerance for a given application will effect the amount of second reactor feed which can be by-passed in this manner. The flow of by-passed feed through the conduit 84a is controlled by suitable adjustment of valves 168. As an operating example, a sufficient quantity of benzene feed and attendant vapors and gases can be by-passed directly to the third reactor 30, when the temperature in the second reactor rises above the design point or when additional production is desired. The by-pass conduit 84a therefore provides auxiliary means for controlling the production in the second reactor.

For exemplary operating modes of the cyclohexane plant 20, the design and minimum inlet temperatures together with the design and maximum outlet temperatures of the several reactors are given in the following table:

TABLE I.—CYCLOHEXANE REACTOR TEMPERATURE INFORMATION AND OPERATION GUIDES

| | 50% design flow | | | | |
|---|---|---|---|---|---|
| | Inlet values, F. | | Outlet values, F. | | Adiabatic temperature rise, ° F. |
| | Design | Limit, min. | Design | Limit, max. | |
| Reactor 26 | 290 | 250 | 450 | 490 | 160 |
| Reactor 28 | 350 | 290 | 500 | 520 | 150 |
| Reactor 30 | 350 | 290 | 395 | 470 | 45 |
| | 100% design flow | | | | |
| Reactor 26 | 290 | 280 | 465 | 490 | 145 |
| Reactor 28 | 320 | 310 | 500 | 520 | 180 |
| Reactor 30 | 320 | 310 | 420 | 470 | 100 |

In one exemplary operating mode, as represented by the first portion of the table denoted "50% Design Flow," the benzene feed is divided equally between reactors 26 and 28, while in the 100% design flow mode, about 35% of the benzene feed is supplied to the first reactor 26, as set forth in the following table:

TABLE II.—FEED RATES AND FLOW DISTRIBUTION FOR CYCLOHEXANE REACTORS

| | Units: lbs./hr. | |
|---|---|---|
| | 50% design flow | 100% design flow |
| Benzene to C-1 | 7,150 | 9,915 |
| Benzene to C-2 | 7,150 | ¹ 18,600 |
| Proportion of benzene to C-1 | 0.5 | 0.35 |
| Total benzene feed | 14,300 | 28,515 |
| Recycle CH to C-1 inlet | 12,600 | 29,900 |
| Recycle CH to C-1 outlet | 6,200 | 21,700 |
| Total recycle | 18,800 | 51,600 |
| Make-up gas | 1,710 | 3,425 |
| Recycle gas | 28,500 | 28,500 |
| Total flow | | 112,025 |

¹ As much as one-half of this benzene can be fed directly to the third reactor 30, when the conversion in the second reactor 28 cannot be reduced to about 70%

In actual tests the cyclohexane product was found to meet a purity of about 99.95%.

Referring again to FIG. 1, the inlet feed temperature to the first reactor 26 is controlled to about 290° F. in this example by sensor 170 in its inlet port 74 which in turn controls by-pass valve 172 through conventional instrumentation to adjust a by-passing flow of the hot effluent from the second reactor 28 around the regenerative heat exchanger 68. After the regenerative heat exchanger 68 the recombined second reactor effluent normally is about 320° F. in the illustrated operation. This is further and variably reduced to about 300° F. at the third reactor inlet 90 by temperature sensor 174 which controls the adjustable pitch of fan 176 forming part of the conventional, intermediate cooler 88. Adjustment in the fan pitch is effected through conventional, interconnecting instrumentation (not shown except schematically at 177).

Similarly the valves 179 associated with the first reactor quench system 42–46 are controlled through conventional instrumentation denoted at 181 by sensor 178 in the inlet 86 of the second reactor 28 to effect a desired inlet temperature of about 300° F.

The ratio of liquid recycle cyclohexane (conduit 57a) to benzene feed in the quench liquid (conduit 76) is controlled by temperature sensor 180 and flow control valve 182 in the liquid cyclohexane recycle conduit 57a, which are likewise coupled through conventional instrumentation denoted at 183. This arrangement of course controls the benzene/cyclohexane ratio in the feed to the second reactor 28. The benzene/liquid cyclohexane ratio in the feed to the first reactor is controlled by flow controllers 184, 186, orifices 188, 190 and valves 192, 194. The operation of the last-mentioned components is proportioned by a conventional ratio controller 196.

Desirably, the ratio controller 196 is in turn reset by the outlet temperature of the first reactor 26 to modify the benzene to liquid cyclohexane ratio of the reactants supplied thereto. One arrangement for doing this includes the use of temperature sensor 197 adjacent the outlet of the catalyst bed 32 which is coupled to the ratio controller 196 through suitable and known instrumentation denoted generally at 199. Thus, if the temperature adjacent the exit of the catalyst bed 32 rises above about 460° F. the proportion of benzene in the reactor feed (conduit 56) is reduced.

Similarly controlled valving denoted generally by valves 198, 200 can be utilized to control the ratio of make-up hydrogen (conduit 62) and recycle gas (conduit 60) and to control the ratio of the gaseous feed component (conduit 66) to the aforedescribed liquid feed components by regulation of valve 202.

My invention therefore provides interdependent control of benzene/liquid cyclohexane ratios, inlet temperatures and outlet temperatures of each reactor together with the ratio of liquids and gases in the feed stream of each reactor. The lower temperatures of the several indicated temperature ranges for the reactor section 22 are thus controlled to eliminate any possible occurrence of dew point temperatures. The higher temperatures of these ranges are controlled below the indicated maximum temperatures (Table I) to provide an adiabatic temperature rise of about 200° F. or less to permit an orderly progression of the highly exothermic reactions, but to prevent undue deactivation of the catalyst. This is accomplished by controlling the ratios of the liquid and gaseous cyclohexane diluents which are recycled to the several reactors. Pure benzene of course cannot be hydrogenated in the absence of such diluents as a temperature rise in the order of 1000° F. would then be anticipated.

To attain a compromise solution to the problems imposed by dew points and catalyst deactivation, and the resultant narrow range of available operating temperatures, temperature and material control must be consistently interdependent. An exemplary arrangement for thus effecting coupled heat and material balance has been set forth with reference to FIG. 1. The principles of the invention can be applied with facility to similar and other petrochemical reactions wherein it is necessary to steer a cautious course between maximum and minimum temperature limits, particularly when highly exothermic reactions are involved.

As noted previously the dew point temperatures of the reactor section 22 can be continuously analyzed by a dew point computer containing conventional elements. It is apparent of course that many features enter into the computation of the dew point, such that the operating personnel do not have the time available for such computations. Moreover, it is exceedingly difficult to determine the specific location or locations within the reactor section where the dew points may be dangerously approached, owing to the dynamic nature of the system, and the attendant, very rapid movement of perturbations throughout the reactor system.

Hence, the various data revealed by conventional instrumentation (not shown) and relating to inlet and outlet temperatures, volumetric flow rates, benzene/diluent liquid ratios and liquid/gas ratios can be fed into the computer for continuous calculations of the dew points. The actual temperatures at a variety of locations within the system can then be compared with computer readout. By observing these comparisons the operator can, if necessary, over-ride the various automatic controls illustrated in FIG. 1 either to shut down or to continue the operation or to adjust material balances at selected points within the reactor section. Alternatively, computer readout can be differentiated automatically with actual temperature and flow readings to shut down the process, or reduce various feed flows to the reactors, or otherwise modify it through the aforementioned over-riding controls.

The principles of my invention can be applied to similar catalytic processes where a totally gaseous phase system must be operated near its dew point to control an exothermic reaction. The invention is particularly adaptable to those catalytic operations wherein the effectiveness factor of the catalyst is low (less than about 0.9) and wherein the reaction rates are further reduced (or quenched) by the presence of liquid in the catalyst pores, rather than the normal vapor. By ensuring a single phase or all gaseous system a uniform diffusivity rate is attained which would otherwise be disrupted if a liquid slug is permitted to engage the catalyst. The invention also is amenable to those operations which are highly exothermic and wherein the reactants must be diluted in carefully controlled ratios of reactants/diluent to control the temperature rise across the reactor.

For greater productivity of the cyclohexane plant 20, a portion of an increased benzene feed can be diverted through conduit 204 directly to the third reactor 30 via conduit 70, regenerative heat exchanger 68 or bypass 172, and the intermediate cooler 88. Alternatively the direct benzene conduit 204 can be utilized to divert a portion of the normal benzene feed from the first or second reactor 26 or 28, or both, as an additional means for controlling the reaction therein. As noted previously the third reactor with its considerably larger catalyst bed 36 is designed to handle an additional output in the event that the second reactor 28 is partially bypassed (conduit 84a). Most importantly, the third reactor is larger to reduce the benzene content to a very low level, i.e. a p.p.m. level. Long space times are needed to do this. The direct flow of benzene to the third reactor 30 can be controlled by valve 206 which in turn can be automatically set by suitable means (not shown) sensitive for example to a given temperature above the control temperature of the first or second reactor outlets or both.

My invention also contemplates means for terminating benzene feed to the reactor section 22, for example by closing stop valve 208 in benzene feed line 48. Desirably the benzene feed is terminated automatically upon the occurrence of abnormal conditions within the reactor system 22, by means, for example, of a temperature sensor 210 or 212 in the outlet of the reactor 26 or 28. In the illustrated arrangement the sensor 210 or 212 is designed to close the benzene feed valve 208 through suitable known circuitry denoted generally at 211 and 213 whenever a maximum temperature of 550° F. occurs in either reactor. A similar sensor 214 can be utilized in the outlet of the third reactor 30 but would not be necessary in most applications, as thorough control of the first two reactors 26, 28 usually exercise a high degree of control over the final reactor 30.

It is also desirable to terminate the benzene feed in the event that the proportion of hydrogen in the recycle gas stream (conduit 60) falls below a predetermined level, for example about 50 percent in the illustrated system. For this purpose a conventional hydrogen analyzer 216 is coupled to the conduit 60 and suitable and known instrumentation denoted generally by dashed line 218 is arranged to close the benzene feed valve 208 when the hydrogen concentration falls below the predetermined level. Similarly it is desirable to terminate the benzene feed if the make-up hydrogen supply (conduit 62) is terminated for a pre-determined interval, for example about five minutes in the illustrated plant. This is accomplished by a suitable sensor 220 in conduit 62 and timer 222 which is coupled through suitable and known instrumentation 223 to the benzene valve 208. The conversion reactions in any of the reactors 26–30 are also deleteriously affected by an insufficient total flow of recycle gas and make-up hydrogen (conduit 66). Therefore, it is additionally desirable to terminate benzene feed in the event that the flow of gas through conduit 66 reaches a pre-determined low value. This is accomplished by use of a flow-measuring device for example orifice 224 and conventional flow meter 226 coupled through suitable instrumentation 228 to the benzene feed valve 208.

From the foregoing it will be apparent that novel and efficient forms of reactivity control in petrochemical processes have been described. While I have shown and described certain presently preferred embodiments of the invention and have illustrated presently preferred methods of practicing the same, it is to be distinctly understood that the invention is not limited thereto but may be otherwise variously embodied and practiced within the spirit and scope of the invention.

I claim:

1. A method for controlling a hydrogenation plant to avoid reactor hot spots and reactor run-aways and catalyst deterioration caused thereby said plant having a plurality of conversion reactors and a catalyst bed in each of said reactors to produce a saturated hydrocarbon from a corresponding unsaturated hydrocarbon, said method comprising the steps of supplying a gaseous hydrogen and liquid unsaturated hydrocarbon reactant feed stream including a recycled portion of said saturated hydrocarbon to one of said reactors in heat exchange relation to an effluent stream of another of said reactors, supplying a second feed stream of at least said liquid reactant to said other reactor in heat exchange relation with the effluent stream of said one reactor, heat exchanging said first-mentioned feed stream and said second feed stream prior to inletting to said reactors until all materials therein are solely in the gaseous phase at a temperature above the dew point of any one of said materials, supplying said effluent stream of said other reactor to an additional reactor, completing the reaction in said one reactor, terminating the reaction in said other reactor prior to completion thereof, passing the unused reactants from said other reactor to said additional reactor to complete the reaction thereof in said additional reactor, and controlling the inlet and outlet temperatures and pressures of the reactants at each of said reactors so that the temperature thereof remains continually above the dew points of all reactants including said recycle portion so as to maintain said reactants completely in the vapor phase uniformly throughout each of said reactors.

2. The method according to claim 1 including the additional step of proportioning the lengths of said catalyst beds to the reactivity rates in the respective reactors.

3. The method according to claim 1 including the additional step of controlling the inlet and outlet temperatures of each of said reactors so that the reaction temperature through all of said reactors remains below a predetermined maximum temperature at which said catalyst begins to deteriorate.

4. The method according to claim 1 including the additional step of terminating the flow of at least one of said reactants to all of said reactors when the outlet temperature of any one of said reactors reaches a pre-determined maximum indicative of a reactor hot spot or run-away condition.

5. The method according to claim 1 including the additional step of variably bypassing a portion of said other reactor feed stream directly to said additional reactor to limit the maximum temperature attained by said other reactor.

6. The method according to claim 1 including the modified step of directly mixing said other reactor feed stream with the effluent stream of said one reactor to accomplish said heat exchange.

7. The method according to claim 1 wherein said recycled effluent portion together with said other reactor feed stream is admixed directly with said one reactor effluent stream.

8. The method according to claim 1 wherein said feed streams include benzene to produce a cyclohexane product of high purity.

9. The method according to claim 8 including the additional steps of recycling a liquid portion of said cyclohexane product to at least one of said benzene feed streams, and recycling a gaseous portion of said cyclohexane product together with any unreacted hydrogen to said hydrogen feed stream.

10. The method according to claim 1 including the additional step of supplying a third liquid unsaturated hydrocarbon feed stream to said additional reactor in heat exchange relation to the effluent of said other reactor.

11. The method according to claim 6 including the modified step of spraying said recycled portion and said second liquid feed stream into said one reactor effluent stream for quenching purposes.

12. The method according to claim 1 wherein the unsaturated hydrocarbon is benzene and the temperature of the reactants in each of said reactors is maintained within the range from about 345° F. to less than 550° F.

13. The method according to claim 1 including the additional step during start-up of said system of increasing the flow rate of said unsaturated hydrocarbon in increments, each of said increments being limited to a maximum of 10% of the design flow rate of said unsaturated hydrocarbon.

14. The method according to claim 1 wherein a portion of said hydrogen feed stream is recycled and the temperature thereof is maintained above the dew point of any of said materials.

15. The method according to claim 1 wherein the flows of both said unsaturated hydrocarbon and of said recycle portion are terminated upon occurrence of a pre-determined maximum pressure drop within said system.

16. The method according to claim 1 wherein the flow of said unsaturated hydrocarbon is terminated in the event the flow of said hydrogen falls below a pre-determined level.

References Cited
UNITED STATES PATENTS

| | | | |
|---|---|---|---|
| 2,755,317 | 7/1956 | Kassel | 260—667 |
| 2,977,288 | 3/1961 | Cabbage | 196—132 |
| 3,228,858 | 1/1966 | Mattyear | 196—155 |
| 3,427,361 | 2/1969 | Arnold | 260—666 |
| 3,450,783 | 7/1969 | Merryfield et al. | 208—143 |
| 2,878,179 | 3/1959 | Hennig | 208—57 |
| 3,132,089 | 5/1964 | Hass et al. | 208—57 |
| 3,254,134 | 5/1966 | Smith et al. | 260—683.9 |
| 3,274,275 | 9/1966 | Hutto et al. | 208—143 |
| 3,341,613 | 9/1967 | Hann | 260—667 |
| 3,428,697 | 2/1969 | Zulveta | 208—143 |

HERBERT LEVINE, Primary Examiner

U.S. Cl. X.R.

208—48 Q, 143; 260—667, 683.9

PO-1050
(5/69)

UNITED STATES PATENT OFFICE
CERTIFICATE OF CORRECTION

Patent No. 3,654,131            Dated April 4 1972

Inventor(s) Norman L. Carr

It is certified that error appears in the above-identified patent and that said Letters Patent are hereby corrected as shown below:

Column 9, line 9, delete "closed" and insert therefor --cooled-- .

Column 12, line 7, of Table, after "total recycle" insert --CH-- .

Signed and sealed this 29th day of August 1972.

(SEAL)
Attest:

EDWARD M. FLETCHER, JR.            ROBERT GOTTSCHALK
Attesting Officer                      Commissioner of Patents